No. 797,061. PATENTED AUG. 15, 1905.
R. P. JACKSON.
CONTROLLER FOR ELECTRIC MOTORS.
APPLICATION FILED JUNE 6, 1904. RENEWED JAN. 21, 1905.
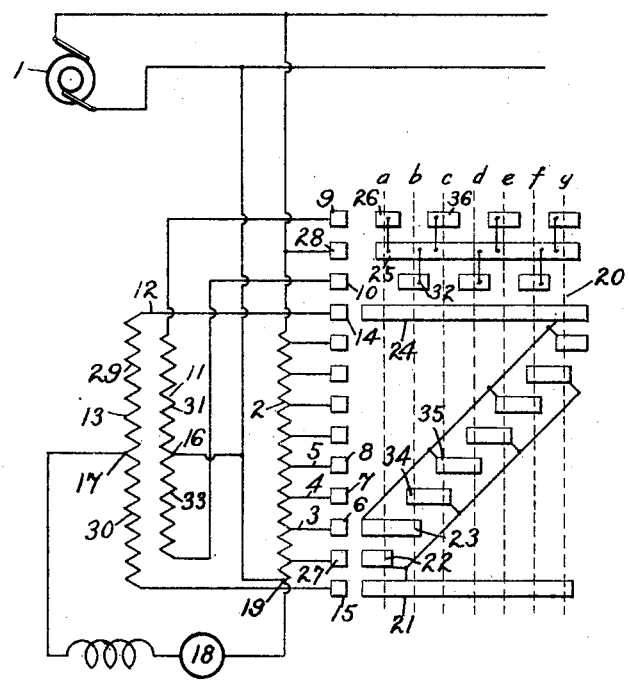
WITNESSES:
Fred H Miller
Otto S. Schainer
INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

No. 797,061.           Specification of Letters Patent.           Patented Aug. 15, 1905.

Application filed June 6, 1904. Renewed January 21, 1905. Serial No. 242,110.

*To all whom it may concern:*

Be it known that I, RAY P. JACKSON, a citizen of the United States, and a resident of Wilkinsburg, in the county of Allegheny and State of Pennsylvania, have invented a new and useful Improvement in Controllers for Electric Motors, of which the following is a specification.

My invention relates to controllers for electric motors which are operated by means of alternating-current energy; and it has for its object to provide means for reducing and preventing arcing between the circuit making and breaking contact-surfaces and consequent injuries to such surfaces.

The speeds of alternating-current motors may be varied by varying the voltages applied to them, and this is commonly done by varying the active lengths of the windings of the transformers from which the motors are supplied with energy. In the operation of controllers which are employed for varying the active lengths of such transformer-windings the motor-circuits are broken at each variation step in the voltage or portions of the main transformer-windings are temporarily short-circuited, and dangerous and destructive arcs are usually produced when either of these changes takes place.

My invention provides means for controlling motors in substantially the manner described and at the same time avoiding dangerous and destructive arcing between the parts of the controller which make and break contact with each other, and it is illustrated diagrammatically in the single figure of the accompanying drawing.

Single-phase alternating-current energy is supplied from any suitable source 1 to a main autotransformer-winding 2, which is subdivided by means of leads 3 4 5, &c., the terminals of which are respectively provided with contact-fingers 6 7 8, &c. If desired, a two-winding transformer may be employed instead of the autotransformer here shown, the secondary winding being subdivided in a manner similar to that shown for the autotransformer-winding.

Connected between contact-fingers 9 and 10 is the primary winding 11 of an auxiliary transformer 12, the terminals of the secondary winding 13 being respectively connected to contact-fingers 14 and 15. The middle points 16 and 17 of the windings 11 and 13 are respectively connected to one terminal of the source 1 and to one terminal of an electric motor 18 or to one terminal of any other suitable translating device the other terminal of which is connected to terminal 19 of the main transformer-winding 2.

In position *a* of controller-drum 20 (here shown in development) drum-segments 21, 22, 23, 24, 25, and 26 respectively engage contact-fingers 15, 27, 6, 14, 28, and 9. Energy is then supplied to the motor 18 from that portion of the winding 2 that constitutes the transformer secondary, one circuit being from lead 3, through contact-finger 6, drum-segments 23 and 24, contact-finger 14, portion 29 of the winding 13, the motor, and that portion of the winding 2 that is comprised between terminal 19 and lead 3. Another circuit is at the same time established from contact-terminal 27 through drum-segments 22 and 21, contact-finger 15, portion 30 of the winding 13, the motor 18, and that portion of the winding 2 that is comprised between terminal 19 and the lead to finger 27. Owing to the inductive action between the two portions 29 and 30 of the winding 13, there is a tendency to equalize the differences of potential between the middle point 17 and the contact-fingers 14 and 15, and the voltage applied to the motor 18 is therefore approximately equal to the difference of potential existing between the terminal 19 of the main transformer-winding 2 and a point midway between the points of connection therewith of the contact-fingers 6 and 27. In order to supply the energy required to magnetize the iron in the magnetic circuit of the transformer 12 and also to further increase the tendency to equalize the differences of potential between the middle point 17 of the winding 13 and its terminals, one half 31 of the winding 11 is energized directly from the source 1, the ratio of transformation between the two windings being properly adjusted for this purpose. As the controller-drum 20 is moved to the position *b* and contact-finger 27 is disengaged from the drum-segment 22 comparatively little sparking occurs, since current is still being supplied to the motor 18 through the portion 29 of the winding 13 which is amply able to carry the current. The drum-segment 26 is then disengaged from the contact-finger 9, and the circuit of the portion 31 of the primary winding 11 is thereby interrupted, and directly thereafter drum-segment 32 engages contact-finger 10, so that portion 33 of the primary winding 11 becomes energized, and finally drum-segment 34 engages contact-finger 7. In this position the main circuit through the motor includes that portion of the winding 2 that is between the terminal 19, the lead 4, contact-finger 7, drum-rings 34 and 21, contact-finger 15, portion 30 of the secondary winding 13, and the motor 18. The mutual actions of the windings of the transformer 12 are similar to those described for position $a$ of the drum 20, and consequently the voltage supplied to the motor 18 is approximately equal to the differences of potential existing between the terminal 19 and a point in the winding 2 midway between the points to which the fingers 6 and 7 are connected. The operation of the controller is similar when moving to the remaining positions, the circuit through the motor 18 alternately including the portions 29 and 30 of the secondary winding 13 and the portions 31 and 33 of the primary winding 11 being alternately energized for the purpose of supplying the magnetizing-current of the transformer 12 in the proper direction. If the controller-drum is in the position $c$ and it is desired to return to a lower voltage—such, for example, as that represented by position $b$—the drum-segment 35 is first disengaged from contact-finger 8, thereby opening the circuit through the portion 29 of the secondary winding 13 and causing the circuit through the motor 18 to include the portion 30 of that winding. Comparatively little sparking occurs when this operation takes place, since the portion 30 of the winding 13 is amply able to carry the motor-current and the voltage of the circuit which is broken is comparatively low. Drum-segment 36 is next disengaged from finger 9, and drum-segment 32 immediately thereafter engages with contact-finger 10, and finally drum-segment 23 engages with contact-finger 6, the circuits then being as before described for position $b$.

It is evident from the description and the drawing that comparatively slight arcing will occur between the drum-segments and the contact-fingers while operating the controllers, since the circuits which are broken are generally of very low voltage and carry only local currents.

While I have shown a single translating device only, it will be understood that a plurality of such devices may be employed and that they may be connected in either series or parallel relation.

I claim as my invention—

1. The combination with a source of variable voltage, alternating-current energy and a suitable translating device, of a transformer comprising primary and secondary windings the middle point of the former of which is connected to one terminal of said source and the middle point of the latter of which is connected to one terminal of said translating device, means for connecting the respective terminals of the primary winding to said source alternately, and means for making variable-voltage connections between the terminals of the secondary winding and said source, the direction of the drop of potential in the windings of the transformer being reversed with each step in the voltage supplied to the translating device.

2. The combination with a source of variable voltage, alternating-current energy and a suitable translating device, of a transformer comprising primary and secondary windings the middle point of the former of which is connected to one terminal of said source and the middle point of the latter of which is connected to said translating device, means for connecting the respective terminals of the primary winding to said source alternately, and means for making variable-voltage connections between the terminals of the secondary winding and said source.

3. The combination with a source of alternating-current energy, a subdivided main transformer-winding connected thereto and a translating device having a terminal connected to the main transformer-winding, of an auxiliary transformer comprising primary and secondary windings the middle point of the former of which is connected to one terminal of the source of energy and the middle point of the latter of which is connected to the other terminal of the translating device, means for connecting the respective halves of the primary winding to the source of energy alternately, and means for connecting the terminals of the secondary winding to the successive points of subdivision of the main transformer-winding.

4. The combination with a source of alternating-current energy, a subdivided main transformer-winding connected thereto, and a translating device having a terminal connected to the main transformer-winding, of an auxiliary transformer comprising primary and secondary windings the middle point of the former of which is connected to one terminal of the source of energy and the middle point of the latter of which is connected to the other terminal of the translating device, means for connecting the respective halves of the primary winding to the source of energy alternately, and means for so connecting the terminals of the secondary winding to the successive points of subdivision of the main transformer-winding that the direction of the drop of potential over the said secondary winding is alternately reversed.

5. The combination with an alternating-current generator and a subdivided main transformer-winding connected thereto, of an auxiliary transformer comprising primary and secondary windings the middle point of the former of which is connected to the source of energy, a translating device connected between the middle point of the secondary winding and a terminal of the main transformer-winding, means for energizing the respective halves of the primary winding alternately, and means for connecting the secondary winding to leads from the various subdivisions of the main transformer-winding.

6. The combination with a source of variable voltage, alternating-current energy and a suitable translating device, of a transformer having primary and secondary windings, a controller for connecting the respective terminals of said primary winding to said source alternately and for making variable-voltage connections between the secondary winding and said source, one terminal of said source being connected to an intermediate point in the primary winding and one terminal of the translating device being connected to an intermediate point in the secondary winding of the transformer.

7. The combination with a source of variable voltage, alternating-current energy and a suitable translating device, of a transformer having primary and secondary windings, a controller for connecting the respective terminals of said primary winding to said source alternately and for making variable-voltage connections between the secondary winding and said source, one terminal of said source being connected to an intermediate point in the primary winding and one terminal of the translating device being connected to an intermediate point in the secondary winding of the transformer and the direction of potential drop in the transformer-windings being reversed at each step in the voltage supplied to the translating device.

8. The combination with a source of alternating-current energy and a suitable translating device, of a transformer having primary and secondary windings the former of which has an intermediate point connected to one terminal of said source and the latter of which has an intermediate point connected to said translating device, means for connecting the respective terminals of the primary winding to said source alternately, and means for making variable-voltage connections between the terminals of the secondary winding and said source.

9. The combination with a source of alternating-current energy, a subdivided main transformer-winding connected thereto and a translating device having a terminal connected to the main transformer-winding, of an auxiliary transformer comprising primary and secondary windings the former of which has an intermediate point connected to one terminal of the source of energy and the latter of which has an intermediate point connected to the other terminal of the translating device, means for connecting the respective terminals of the primary winding of the auxiliary winding to the source of energy alternately, and means for connecting the terminals of the secondary winding to the successive points of subdivision of the main transformer-winding.

10. The combination with a source of alternating-current energy, a subdivided main transformer-winding connected thereto, and a translating device having a terminal connected to the main transformer-winding, of an auxiliary transformer comprising primary and secondary windings the former of which has an intermediate point connected to one terminal of the source of energy and the latter of which has an intermediate point connected to the other terminal of the translating device, means for connecting the respective terminals of the primary winding to the source of energy alternately, and means for so connecting the terminals of the secondary winding to the successive points of subdivision of the main transformer-winding that the direction of the drop of potential over the said secondary winding is alternately reversed.

11. The combination with an alternating-current generator and a subdivided main transformer-winding connected thereto, of an auxiliary transformer comprising primary and secondary windings the former of which has an intermediate point connected to the source of energy, a translating device connected between an intermediate point of the secondary winding and a terminal of the main transformer-winding, means for energizing the respective portions of the primary winding alternately, and means for connecting the secondary winding to leads from the various subdivisions of the main transformer-winding.

12. The combination with a source of alternating-current energy and a translating device, of a transformer having primary and secondary windings the former of which has an intermediate point connected to one terminal of said source and the latter of which has an intermediate point connected to one terminal of said translating device and a controller that operates to connect the respective terminals of the primary winding to said source alternately and to make variable-voltage connections between the terminals of the secondary winding and said source.

In testimony whereof I have hereunto subscribed my name this 27th day of May, 1904.

RAY P. JACKSON.

Witnesses:
H. B. MYER,
BIRNEY HINES.